United States Patent
Kojima

(10) Patent No.: US 8,760,036 B2
(45) Date of Patent: Jun. 24, 2014

(54) VIBRATION WAVE DRIVING APPARATUS

(75) Inventor: Nobuyuki Kojima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/404,176

(22) Filed: Feb. 24, 2012

(65) Prior Publication Data

US 2012/0248934 A1 Oct. 4, 2012

(30) Foreign Application Priority Data

Mar. 31, 2011 (JP) ................................ 2011-077535

(51) Int. Cl.
*H02N 2/04* (2006.01)

(52) U.S. Cl.
USPC ............. 310/323.02; 310/323.16; 310/323.01

(58) Field of Classification Search
USPC ............................... 310/323.01–323.06, 328, 310/323.13–323.17
IPC ....................................................... H02N 2/04
See application file for complete search history.

(56) References Cited

U.S. PATENT DOCUMENTS

| | | | | |
|---|---|---|---|---|
| 5,783,899 | A | * | 7/1998 | Okazaki .................... 310/317 |
| 7,109,639 | B2 | * | 9/2006 | Yamamoto et al. ...... 310/323.16 |
| 7,365,474 | B2 | | 4/2008 | Yamamoto et al. |
| 7,583,008 | B2 | * | 9/2009 | Kojima et al. ........... 310/323.01 |
| 2005/0242686 | A1 | * | 11/2005 | Yamamoto et al. ...... 310/323.02 |
| 2006/0250047 | A1 | * | 11/2006 | Yamamoto et al. .......... 310/317 |
| 2011/0278987 | A1 | | 11/2011 | Oda et al. |

FOREIGN PATENT DOCUMENTS

| | | |
|---|---|---|
| JP | 2006-301454 A | 11/2006 |
| JP | 2006-301457 A | 11/2006 |

* cited by examiner

*Primary Examiner* — Thomas Dougherty
*Assistant Examiner* — Karen B Addison
(74) *Attorney, Agent, or Firm* — Fitzpatrick, Cella, Harper & Scinto

(57) ABSTRACT

A vibration wave driving apparatus includes a vibrator for driving a driven body and a member for supporting the vibrator. The construction can restrain increases in the number of components and in necessary space and can maintain a stable contact state of frictional surfaces of the vibrator and the driven body.

6 Claims, 13 Drawing Sheets

MODE-A  MODE-B

MODE-A

VIBRATION WAVE DRIVING APPARATUS

BACKGROUND OF THE INVENTION

1. Field of the Invention

The present invention relates to a vibration wave driving apparatus. Particularly, the present invention relates to a vibration wave driving apparatus for relatively moving an ultrasonic vibrator and a driven body by combining vibrations of different vibration modes.

2. Description of the Related Art

A vibration wave driving apparatus for relatively moving an ultrasonic vibrator and a driven body by combining vibrations of different vibration modes has been proposed.

Such a vibration wave driving apparatus has a pressure-application structure to generate a frictional force between the ultrasonic vibrator and the driven body.

Further, the vibration wave driving apparatus is given a support structure for maintaining abutment of frictional surfaces formed between the ultrasonic vibrator and the driven body with an appropriate relation.

As this support structure, some methods have been proposed.

One of them is a configuration in which an ultrasonic vibrator or a driven body is held by a biasing component formed in a planar spring shape (see Japanese Patent Application Laid-Open No. 2006-301457). In this case, the biasing component (member) serves as a supporting member. Another one of them is a configuration in which an ultrasonic vibrator or a driven body is rotatably held by a mechanism through a sphere-shaped member (see Japanese Patent Application Laid-Open No. 2006-301454).

The following describes a necessary requirement for the supporting member having such a support structure.

FIG. 10A shows a state where an ultrasonic vibrator 3 and a driven body 4 abut with each other in parallel (in a state where their respective frictional surfaces come into contact with each other).

In this figure, an X-axis indicates an occurrence direction of relative motion of a vibration wave driving apparatus. Further, a Z-axis indicates a normal-line direction with respect to frictional surfaces of the ultrasonic vibrator 3 and the driven body 4, and a Y-axis indicates a direction orthogonal to the X-axis and the Z-axis.

When each of the ultrasonic vibrator 3 and the driven body 4 is provided ideally, abutting surfaces of the ultrasonic vibrator 3 and the driven body 4 are disposed parallel to each other.

By giving an applied pressure (not shown) in the Z-direction in such a positional relationship to displace the ultrasonic vibrator 3 or the driven body 4 in the Z-direction, an abutment force can be given between the frictional surfaces thereof.

However, in a practical sense, it is extremely difficult to provide the frictional surfaces of the ultrasonic vibrator 3 and the driven body 4 at parallel positions due to manufacturing errors of components, installation errors, and the like.

Therefore, some ideas are necessary for the holding of the ultrasonic vibrator 3 or the driven body 4.

The support structure has a degree of freedom to a rotational displacement θx (a direction of an arrow dθx in FIG. 10C) around the X-axis and a rotation displacement θy (a direction of an arrow dθy in FIG. 10D) around the Y-axis. Further, the support structure is provided such that the ultrasonic vibrator or the driven body is held to be able to move in the Z-axis direction (a direction of an arrow dz in FIG. 10B), thereby maintaining imparting of the abutment force and a surface-contacting state of their respective frictional surfaces.

SUMMARY OF THE INVENTION

FIG. 11A shows a perspective view of an ultrasonic vibrator unit 2 which has been conventionally proposed. FIG. 11B shows an exploded perspective view of the ultrasonic vibrator unit 2. The ultrasonic vibrator unit 2 is constituted by an ultrasonic vibrator 3, a supporting member 13, and two spacer components 14.

The ultrasonic vibrator unit 2 and a driven body (not shown) perform relative displacement motion in the X-direction in the figure.

The ultrasonic vibrator 3 is formed by bonding or the like in an integrated manner of a vibration plate 11 made from a metal material into a substantially plate shape and a piezoelectric element board 12 made from a piezoelectric element material serving as an electrical-mechanical energy conversion element into a substantially rectangular plate shape.

On the ultrasonic vibrator 3, flexible printed circuits (not shown) and the like for electrical connection with the outside are disposed.

The vibration plate 11 includes a rectangular vibration portion 11a located substantially in the center thereof, projecting portions 11b formed at two positions in the X-direction in the figure on a top face of the vibration portion 11a, and fixed portions 11c formed at both sides of the vibration portion 11a in the Y-direction. The vibration plate 11 has a substantially symmetrical shape in the X-direction and the Y-direction.

Upper ends of the two projecting portions 11b are portions which come into contact with a frictional surface of a driven body (not shown) under pressure.

In order to restrain abrasion by driving, it is necessary for frictional surfaces of the vibrator and the driven body to have surface contact with each other, and thus, the two projecting portions 11b have a width in the Y-direction.

On a top face of the projecting portion 11b, an end part at a negative side of the Y-direction is referred to as a point T1 and an end part at a positive side of the Y-direction is referred to as a point T2 to be used for the following explanation.

With the use of FIGS. 12A and 12B, the following describes examples of two vibration modes excited by the ultrasonic vibrator 3. FIG. 12A shows a perspective view of two vibration modes excited by the ultrasonic vibrator 3.

In this example, an alternating voltage is applied to the piezoelectric element board 12 to excite the ultrasonic vibrator 3 in two out-of-plane bending vibration modes (MODE-A and MODE-B).

MODE-A is a primary out-of-plane bending vibration mode in which two nodes appear substantially parallel to each other in an X-axis direction in the figure which is a longitudinal direction of the ultrasonic vibrator 3, and has a substantially symmetrical shape with respect to a YZ plane. The vibration of MODE-A causes the two projecting portions 11b to be excited with an amplitude displaced in a direction (a Z-axis direction) perpendicular to the surfaces having contact with the driven body.

MODE-B is a secondary out-of-plane bending vibration mode in which three nodes appear substantially parallel to each other in a Y-axis direction in the FIG. in the ultrasonic vibrator 3, and has a shape that is anti-symmetrical with respect to a YZ plane and symmetrical with respect to an XZ plane. The vibration of MODE-B causes the two projecting portions 11b to be excited with an amplitude displaced in a direction (an X-axis direction) parallel to the surfaces having contact with the driven body.

The combination of these two vibration modes causes an elliptical motion component in a substantially XZ plane to occur on those top faces of the two projecting portions 11b which are contact portions, thereby causing a force which drives the driven body in a substantially X-axis direction. Due to this driving force, the ultrasonic vibrator 3 and the driven body move relatively to each other.

FIG. 12B is a vibration mode of MODE-A shown on a YZ cross-section of the ultrasonic vibrator 3 in the vicinity of the projecting portion.

As described earlier, vibration displacement in the Z-axis direction is excited on the top face of the projecting portion 11b, and in addition to this, a vibration component in the Y-direction is also excited.

In the vicinity of that end part at the negative side of the Y-direction which is shown as a point T1 in the figure, a vibration component in a negative Y-direction occurs when a Z-directional vibration component occurs in its positive direction.

On the other hand, in the vicinity of that end part at the positive side of the Y-direction which is shown as a point T2 in the figure, a vibration component in a positive Y-direction occurs. The vibration components in the Y-direction work as forces to cause the ultrasonic vibrator 3 and the driven body to move relatively to each other.

If the vibration state of the ultrasonic vibrator 3 is an ideal state and the top face of the projecting portion 11b has uniform contact with the driven body, a resultant force of generating forces in the Y-direction on the top face of the projecting portion 11b is zero.

However, for example, if only the vicinity of the point T1 has contact with the driven body, the resultant force of the generating forces in the Y-direction on the top face of the projecting portion 11b is not zero, and thus the force works toward the positive Y-direction.

In this example, the ultrasonic vibrator 3 using MODE-A and MODE-B mentioned above is applied, but even if ultrasonic vibrators adopting other ultrasonic vibrator shapes and vibration modes are used, the same things can be said.

Referring back to FIGS. 11A and 11B, the explanation continues.

On bottom sides in the Z-direction of the two fixed portions 11c of the ultrasonic vibrator 3, two spacer components 14 are disposed to be fixed thereto by bonding or the like.

The vibration portion 11a is a portion where ultrasonic vibration is excited and it is necessary to spatially separate the vibration portion 11 from a supporting member or the like. Accordingly, the supporting member 13 is fixed through the spacer components 14. The supporting member 13 is a component having an elastic structure formed into a shape of a thin flat plate by punching processing or etching processing from a sheet metal suitable for a spring material.

The supporting member 13 has a substantially symmetrical shape with respect to the XY plane and the YZ plane. The supporting member 13 is provided with two first fixed portions 13a extending in the X-direction and two second fixed portions 13b extending in the Y-direction. An elastically-deformable portion 13e is formed to connect these first fixed portions 13a and second fixed portions 13b.

With the use of elastic deformation of the elastically-deformable portion 13e, a support effect for the ultrasonic vibrator 3 in the ultrasonic vibrator unit 2 is obtained.

The supporting member 13 is provided to be put on a bottom side (a downward side in the z-direction in the figure) of the ultrasonic vibrator 3. These two components are disposed with a desired space by the spacer components 14 so as to prevent the supporting member 13 from coming into contact with a vibration deformable portion of the ultrasonic vibrator 3 to obstruct vibration deformation of the ultrasonic vibrator 3.

The supporting member 13 is fixed by the spacer components 14 and the second fixed portions 13b. The supporting member 13 is fixed by fixing components (not shown) at positions of the first fixed portions 13a.

In a state where the ultrasonic vibrator 3 is incorporated in the ultrasonic vibrator unit 2, X-axis rotational displacement occurs in the ultrasonic vibrator 3 with taking a center position in the Y-direction in the supporting member 13 as a center of the rotation.

Schematic diagrams to describe an example of a relation between force and displacement in the ultrasonic vibrator unit 2 having such a configuration are shown in FIGS. 13A and 13B.

In FIGS. 13A and 13B, only cross-sectional shapes of the ultrasonic vibrator 3 and the supporting member 13 on the YZ plane are shown, and structures that are unnecessary for explanation are omitted for convenience.

A point P3 is a center point when X-axis rotational displacement occurs in the ultrasonic vibrator 3.

The ultrasonic vibrator 3 comes into contact with the driven body (not shown) under pressure, and thus receives an applied pressure from the driven body in a negative Z-direction.

At this time, the applied pressure may become uneven for some reason (accuracy of a pressure application mechanism, relative inclination between the contact surfaces of the ultrasonic vibrator 3 and the driven body, and the like).

In FIG. 13A, a state of the applied pressure is simplified, and it is assumed that the applied pressure is concentrated in the point T1 and the point T2.

Here, a case where an applied pressure Fz1 at the point T1 is larger than an applied pressure Fz2 at the point T2 is shown.

When the ultrasonic vibrator 3 is driven, Y-directional displacement occurs at the point T1 and the point T2 as shown by use of FIG. 13B.

As generating forces occurring between the ultrasonic vibrator 3 and the driven body by this Y-directional displacement, generating forces Fy1 and Fy2 in the Y-axis direction occur as shown in the figure.

These generating forces Fy1 and Fy2 in the Y-direction are substantially proportional to respective applied pressures at the point T1 and the point T2, and therefore, |Fy1|>|Fy2| is formed.

Because of this, a resultant force to displace the frictional surface of the ultrasonic vibrator 3 in the Y-direction that is orthogonal to a driving direction, i.e., the X-direction, is caused. As a result, a force Fθx around the X-axis occurs in the ultrasonic vibrator 3 with taking a point P3 as a center of the rotation, and the ultrasonic vibrator 3 causes X-axis rotational displacement around the point P3, as shown in FIG. 13B.

This causes the point T1 to be displaced in the positive Z-direction and the point T2 to be displaced in the negative Z-direction, thereby resulting in that the applied pressure Fz1 at the point T1 increases and the applied pressure Fz2 at T2 decreases.

From this, the difference between |Fy1| and |Fy2| further increases, whereby Fθx also increases.

In short, the difference between the forces at the points T1 and T2, shown in FIG. 13A, changes to be worsened, and a stable contact state of the frictional surfaces cannot be obtained, which may decrease durability due to unsymmetrical wear or the like of a frictional surface.

On the other hand, according to a holding method disclosed in Japanese Patent Application Laid-Open No. 2006-301454, a center of rotational displacement of θx can be disposed within a frictional surface, and thus, the holding method can deal with such a problem.

However, in this method, in terms of restraining the number of components and a necessary space, satisfactory results cannot be necessarily obtained.

In view of the above problems, an object of the present invention is to provide a vibration wave driving apparatus which can restrain increases in the number of components and in necessary space and which can maintain a stable contact state of frictional surfaces of a vibrator and a driven body.

A vibration wave driving apparatus of the present invention is a vibration wave driving apparatus including: a vibrator including a vibration body having a frictional surface and an electrical-mechanical energy conversion element; and a driven body which has a frictional surface having contact with the frictional surface of the vibrator and which is configured to be pressed through the respective frictional surfaces, wherein the driven body is relatively moved by elliptic motion of the vibrator through the respective frictional surfaces, the vibration wave driving apparatus includes a supporting member having elastically-deformable portions for supporting the vibrator, and the supporting member is configured such that, when receiving a force in a first direction which is a direction orthogonal to a direction in which the vibrator relatively moves the driven body and a pressed direction in which the driven body is pressed, the supporting member is capable of displacing the frictional surface of the vibrator parallel to the frictional surface of the driven body by rotational deformation of the elastically-deformable portions accompanied with no deformation in the first direction.

According to the present invention, a vibration wave driving apparatus which can restrain increases in the number of components and in necessary space and which can maintain a stable contact state of frictional surfaces of a vibrator and a driven body can be realized.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the present invention, "to displace an object parallel" means not only to displace the object strictly parallel, but also includes a case where, relative to a parallel state, the object deviates from the parallel state as far as no adverse effect such as unsymmetrical wear of a frictional surface is caused.

The present invention gives an explanation with the use of a wording "to displace an object substantially parallel" as a wording to express such a state including a given deviation from the parallel state.

For example, even if the object deviates from a strictly parallel state by 1°, the deviation is permissible as far as no adverse effect such as unsymmetrical wear of a frictional surface is caused or the effect is small.

In the present invention, "to displace a frictional surface of a vibrator parallel to a frictional surface of a driven body" means that the frictional surface of the vibrator is displaced substantially parallel to the frictional surface of the driven body without inclining the frictional surface of the vibrator to the frictional surface of the driven body.

In the present invention, "a first direction that is a direction orthogonal to a direction in which a vibrator relatively moves a driven body and a pressed direction (in which a vibrator or a driven body is pressed)" means a direction which is orthogonal to a direction in which a vibrator relatively moves a driven body and which is also orthogonal to a pressed direction in which a vibrator or a driven body is pressed.

In addition, "to receive a force in the first direction" includes, in a state where the force works, not only a case where a force is received only in the first direction, but also a case where a force including components of the force working in the first direction is received.

Preferred embodiments of the present invention will now be described in detail in accordance with the accompanying drawings.

Embodiment 1

As Embodiment 1 is described an exemplary configuration of a vibration wave driving apparatus to which the present invention is applied.

The vibration wave driving apparatus of the present embodiment includes a vibrator including a vibration body having a frictional surface and an electrical-mechanical energy conversion element, and a driven body which has a frictional surface having contact with the frictional surface of the vibrator and which is configured to be pressed through the respective frictional surfaces.

Further, the vibration wave driving apparatus is configured so that the driven body is relatively moved by elliptic motion of the vibrator through those respective frictional surfaces.

Figure 1:
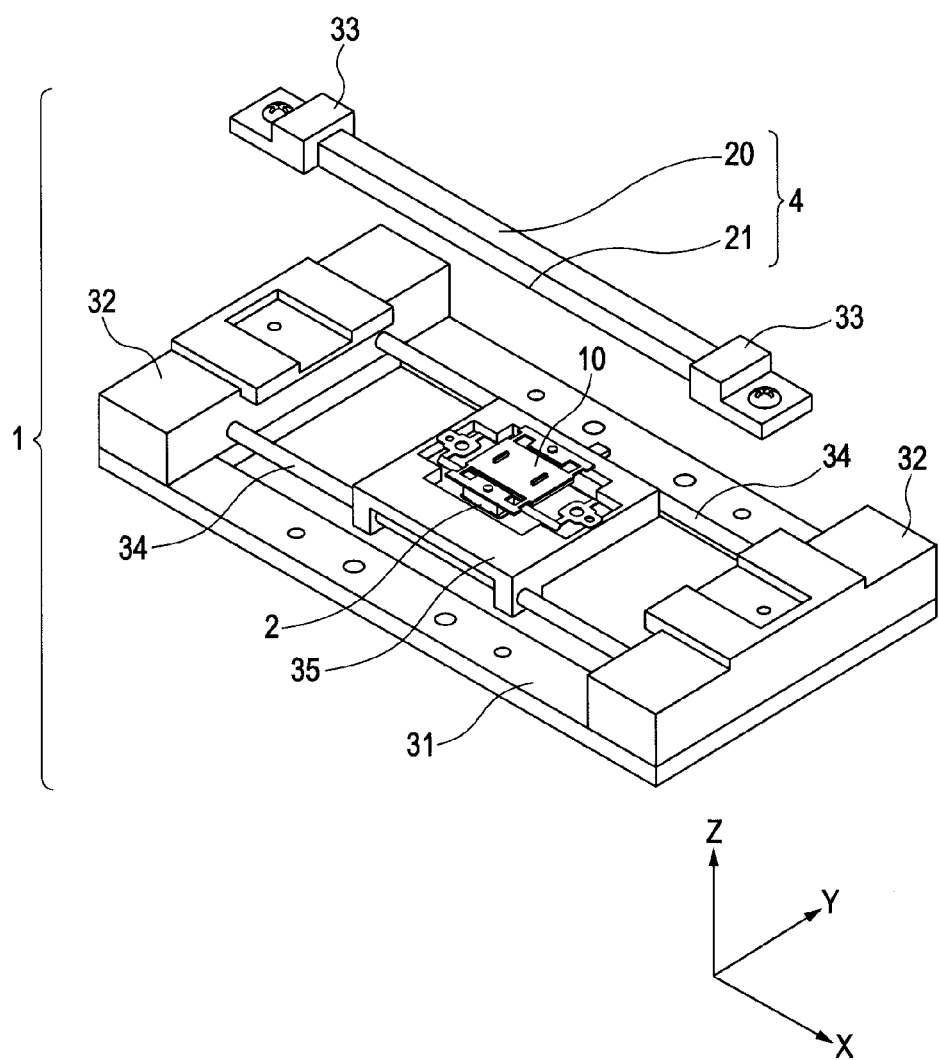
FIG. 1 is an exploded perspective view showing an exemplary configuration of a vibration wave driving apparatus according to Embodiment 1 of the present invention.

More specifically, as shown in FIG. 1, a vibration wave driving apparatus 1 of the present embodiment is configured as an apparatus which includes what is called an ultrasonic motor as a source of a driving force and which performs linear driving with one degree of freedom.

As main constituent components of the ultrasonic motor, an ultrasonic vibrator unit 2 and a driven body 4 are disposed.

The vibration wave driving apparatus 1 includes a first base 31, and two second bases 32 which are fixed to the first base 31.

Two guide bars 34 extending in an X-direction are held and fixed so that they are sandwiched between the two second bases 32.

A slide component 35 is interlocked with the guide bars 34 to be maintained slidable in the X-direction in the figure.

The ultrasonic vibrator unit 2 is fixed to the slide component 35.

Both ends of the driven body 4 are held and fixed to the two second bases 32 through driven body frames 33.

In the figure, the driven body 4 and the driven body frames 33 are expressed separately as different components, but actually, they are interlocked with each other in an integrated manner.

The driven body 4 is formed by bonding a driven body base 20 and a friction member 21 to be fixed to each other. The driven body base 20 is made from a magnetic material such as a neodymium magnet and is subjected to a magnetizing process in a Z-direction in the figure.

A lower surface (a negative side in the Z-direction) of the driven body base 20 is a plane facing the ultrasonic vibrator unit 2, and the friction member 21 is disposed at this position.

Due to relative displacement motion occurring between the ultrasonic vibrator 3 and the driven body 4, the ultrasonic vibrator 3 and the slide component 35 cause X-directional moves in the figure.

Driving force or displacement can be taken out from the slide component 35 to drive any apparatus. The vibration wave driving apparatus of the present embodiment is an example to be used for explanation, and any configuration can be selected.

Figure 2:
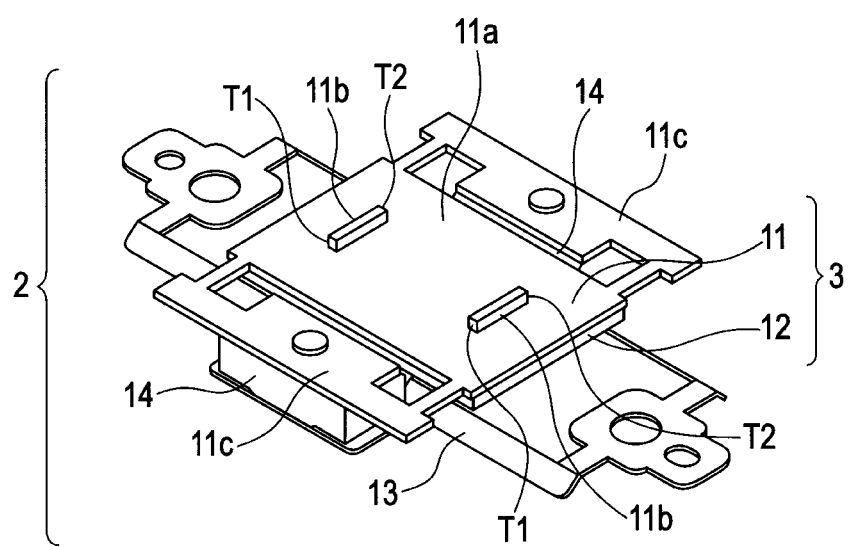
FIG. 2 is a perspective view of an ultrasonic vibrator unit in Embodiment 1 of the present invention.
Figure 3:
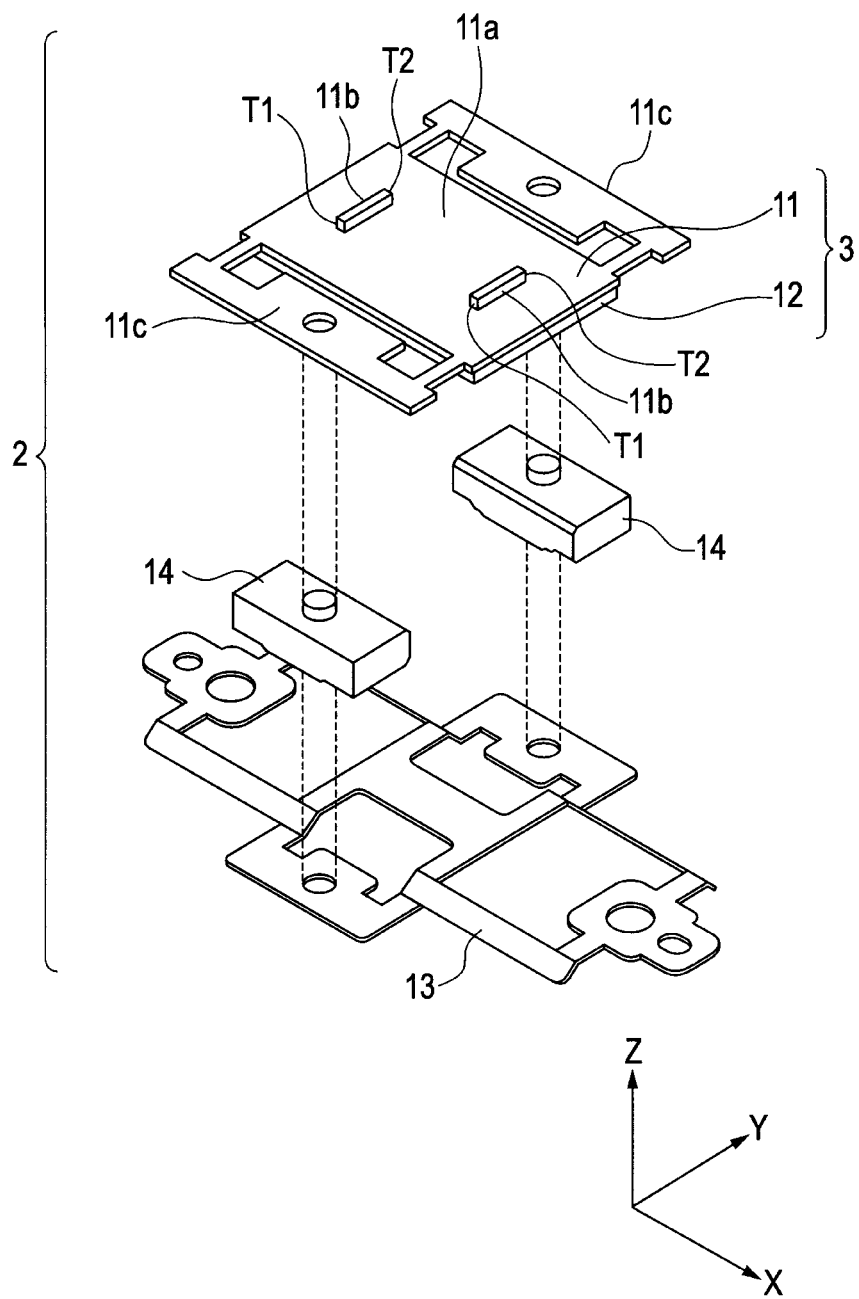
FIG. 3 is an exploded perspective view of the ultrasonic vibrator unit in Embodiment 1 of the present invention.

FIG. 2 is a perspective view of the ultrasonic vibrator unit 2 used in the vibration wave driving apparatus 1 in Embodiment 1, and FIG. 3 is an exploded perspective view of the ultrasonic vibrator unit 2.

The ultrasonic vibrator unit 2 is formed from an ultrasonic vibrator 3, a supporting member 13, and two spacer components 14.

Figure 11A:
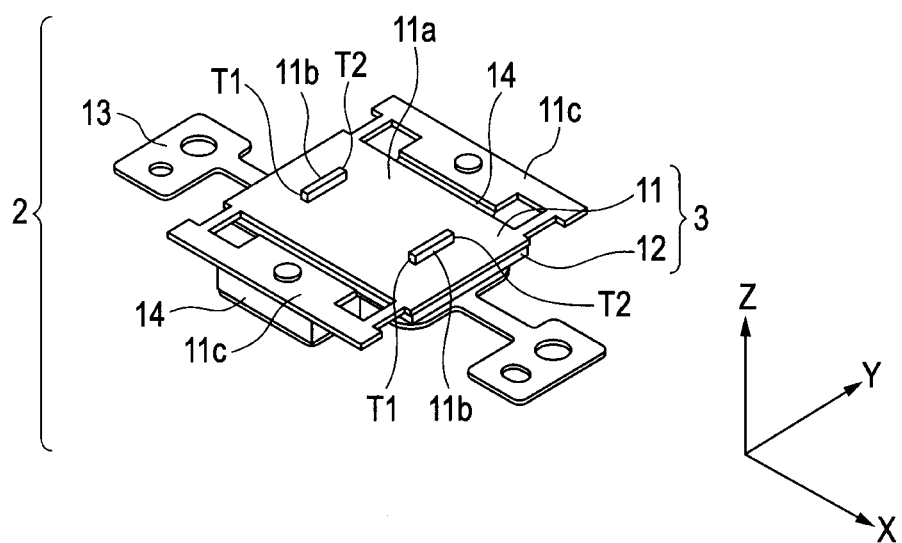
FIG. 11A is a perspective view of an ultrasonic vibrator unit which describes the conventional example.
Figure 11B:
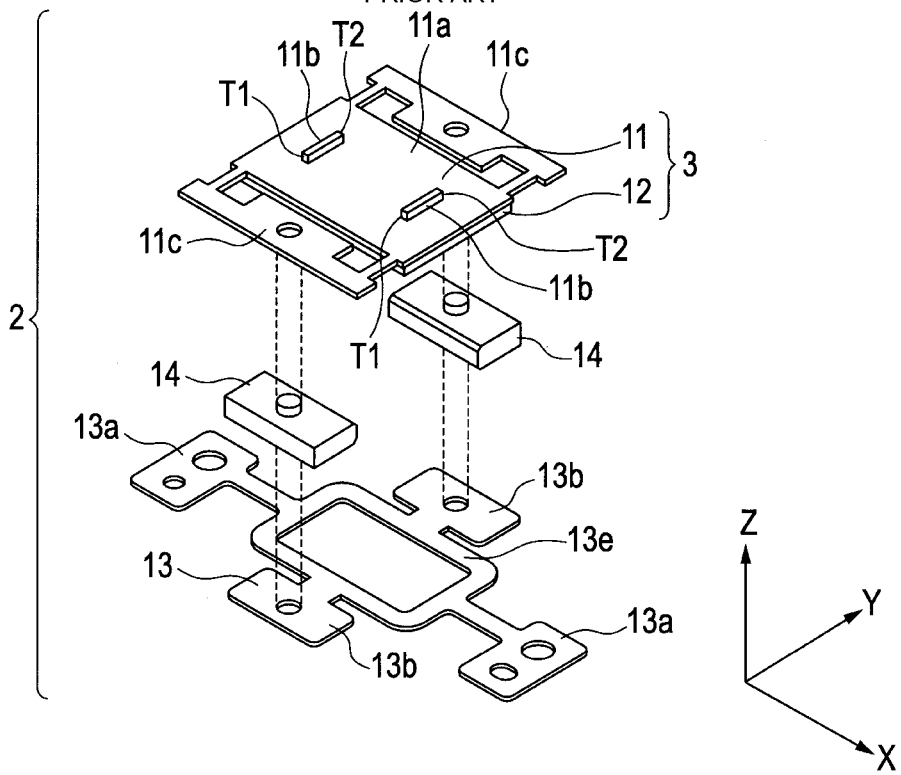
FIG. 11B is an exploded perspective view of the ultrasonic vibrator unit which describes the conventional example.
Figure 12A:
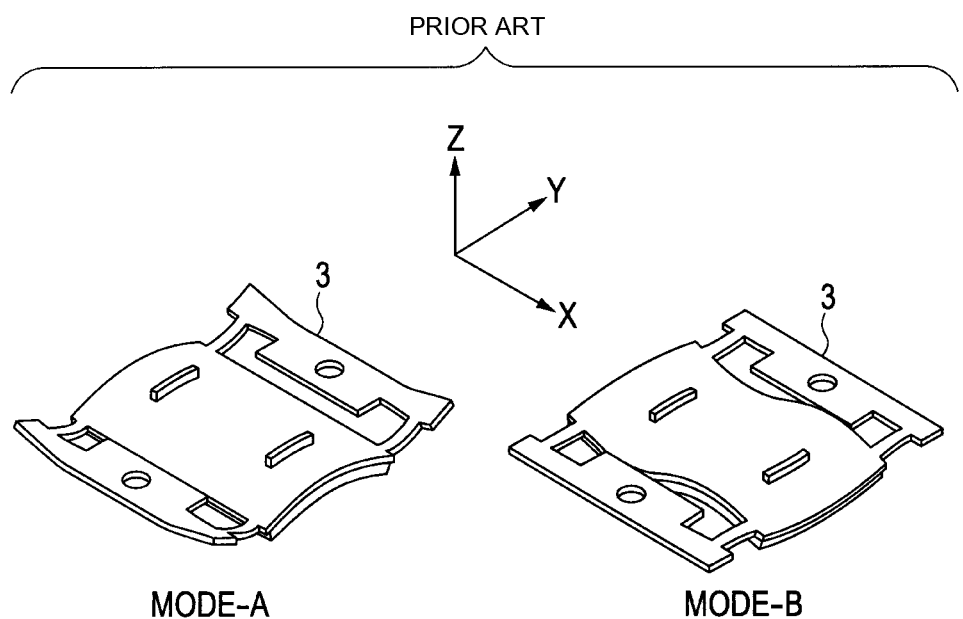
FIG. 12A is a view showing vibration modes of the ultrasonic vibrator in the conventional example.
Figure 12B:
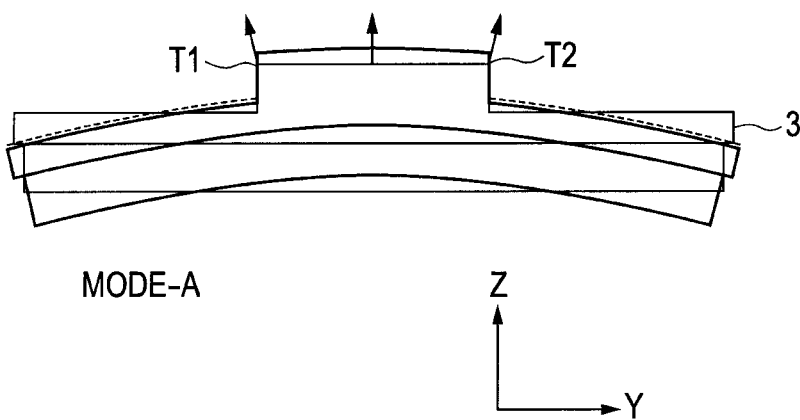
FIG. 12B is a view showing a vibration mode of the ultrasonic vibrator in the conventional example.

The ultrasonic vibrator 3 in the present embodiment has a configuration similar to the ultrasonic vibrator 3 shown in FIG. 11B, and the explanation which has been given in Summary of the Invention is omitted. A vibration plate 11 in the present embodiment is made from a metal material having a ferromagnetic property and is pulled by the driven body base 20. This magnetic attractive force gives necessary applied pressure between the ultrasonic vibrator 3 and the driven body 4.

The following describes that supporting member having elastically-deformable portions which support the vibrator.

Figure 4A:
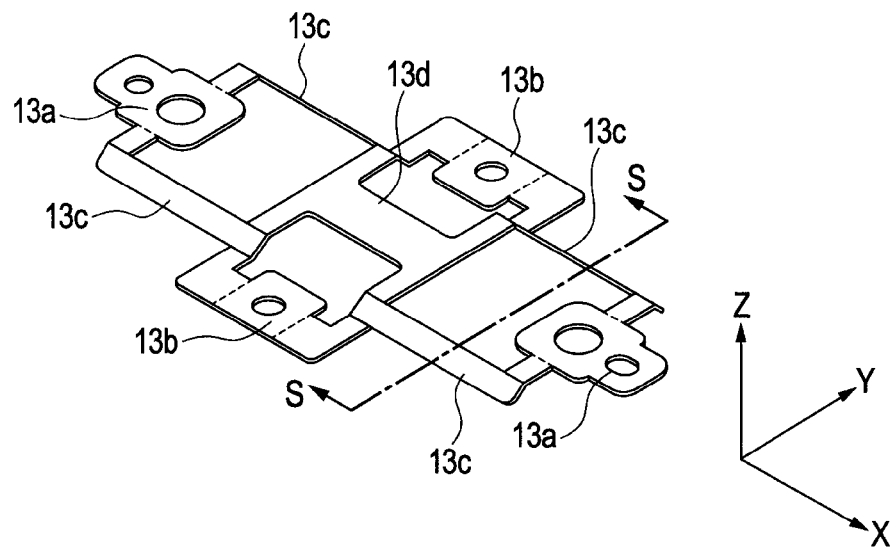
FIG. 4A is a perspective view of a supporting member in Embodiment 1 of the present invention.

FIG. 4A shows a perspective view of the supporting member 13.

The supporting member 13 is made from a thin sheet metal material by shape formation and bending processing.

The supporting member 13 has a substantially symmetrical shape in the X-direction and the Y-direction (a plane of which a normal line is in a direction of the relative displacement and a plane of which a normal line is in the first direction which is a direction orthogonal to the pressed direction).

The supporting member 13 is provided with two first fixed portions 13a extending in the X-direction in the figure, and two second fixed portions (holding portions) 13b on both sides in the Y-direction.

Four elastically-deformable portions 13c are formed to connect the first fixed portions 13a and the second fixed portions 13b.

In addition to them, in the supporting member 13, a reinforcement portion 13d is formed to connect the two second fixed portions 13b.

The first fixed portions 13a are portions having contact with the driven body frames 33 shown in FIG. 1 to be fixed thereto, and serve as attachment portions to the driven body frames 33 of the ultrasonic vibrator unit 2. The second fixed portions 13b are interlocked with Z-directional bottom surfaces of the spacer components 14 to be fixed thereto.

The supporting member 13 is provided on a downward side of the ultrasonic vibrator 3 in the Z-direction and positioned so that respective center positions thereof substantially correspond to each other in the X-direction and the Y-direction, and thus, the ultrasonic vibrator unit 2 has a substantially symmetrical shape in the X-direction and the Y-direction.

When forces or displacements from the outside are applied to the two projecting portions 11b of the vibration plate 11 in a state where the first fixed portions 13a of the supporting member 13 are fixed to the driven body frames 33, elastic deformation occurs in the elastically-deformable portions 13c of the supporting member 13 according to their values, thereby causing a change in an attitude of the ultrasonic vibrator 3.

In a state where the ultrasonic vibrator 3 is incorporated in the vibration wave driving apparatus 1, elastic deformation occurs in the elastically-deformable portions 13c so that the frictional surfaces of the vibrator 3 and the driven body 4 have surface contact with each other to follow each other, and hereby the vibrator 3 is supported. Further, in the present invention, if the supporting member has a biasing function (for example, a spring property is given thereto), the supporting member can serve as a biasing member.

Figure 4B:
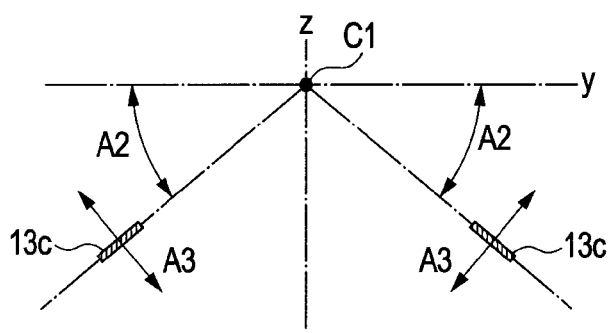
FIG. 4B is a cross-sectional view of the supporting member in Embodiment 1 of the present invention.

FIG. 4B shows YZ cross-sections at a position shown by reference signs S in FIG. 4A, namely, of the elastically-deformable portions 13c of the supporting member 13.

The elastically-deformable portions 13c have a shape obtained by performing bending processing at a desired angle on a part of the supporting member 13 made from a thin sheet metal material, and have an angle A2 with respect to the Y-axis in the figure.

An intersection C1 of extended lines of the cross sections of the elastically-deformable portions 13c is in a vicinity of a frictional surface of the projecting portion 11b of the vibrator 3 when the supporting component 13 is incorporated in the ultrasonic vibrator unit 2.

The elastically-deformable portions 13c are formed to have low stiffness in a direction shown by an arrow A3 and have large stiffness in a direction (a direction inclined to the first direction on a plane of which a normal line is in a direction of the relative displacement motion) orthogonal to this arrow A3 on the YZ plane.

Further, the elastically-deformable portions 13c are provided at positions to be symmetrical with respect to the plane of which a normal line is in the first direction.

The elastically-deformable portions 13c have a shape extending in the X-direction in the figure on the same cross-section, and work as a rectangular thin-sheet leaf spring.

Figure 4C:
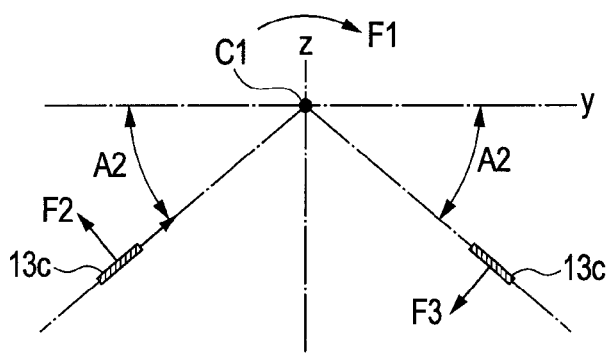
FIG. 4C is a cross-sectional view of the supporting member in Embodiment 1 of the present invention.

An example of a state where an external force is exerted on the frictional surface of the vibrator 3 in a state where the supporting member 13 is incorporated into the vibrator unit 2 is shown in FIG. 4C.

FIG. 4C shows the same cross-section as in FIG. 4B. When an external force around an x-axis, i.e., F1 at the intersection C1 as shown by an arrow in the figure is applied to the frictional surface of the vibrator 3, F2 and F3 are respectively applied to two elastically-deformable portions 13c of the supporting member.

These forces F2 and F3 correspond to normal-line directions of the plate materials. Since the elastically-deformable portions 13c have low stiffness in these respective directions, the elastically-deformable portions 13c are deformed in respective directions corresponding to these forces F2 and F3.

When the deformations of the two elastically-deformable portions 13c are synthesized, the position of the intersection C1 does not change before and after the deformations. In view of this, on the frictional surface of the vibrator 3, when an x-axis rotational deformation force occurs around the height of this frictional surface, the vibrator 3 can cause only rotational displacement around the height of the frictional surface.

Figure 5A:
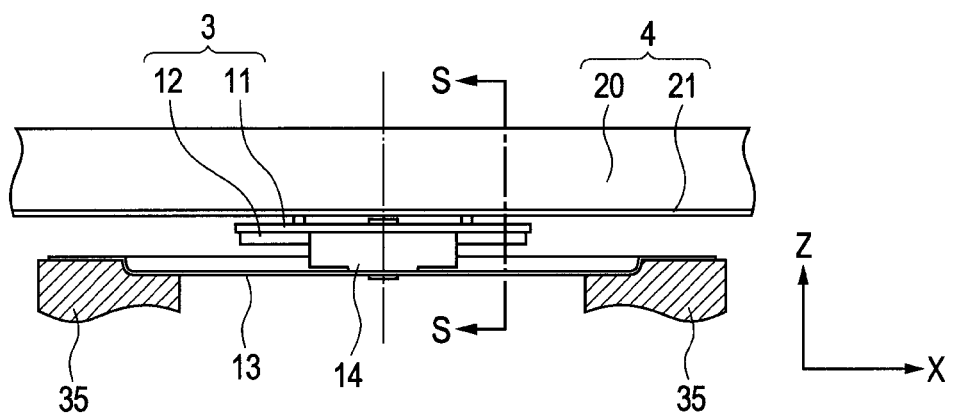
FIG. 5A is a partial sectional view of the vibration wave driving apparatus in Embodiment 1 of the present invention.

FIG. 5A shows a front view (a view observed from the Y-direction) of the vibration wave driving apparatus 1. In this figure, constituent components unnecessary for explanation and a part of the constituent components are omitted.

In the present embodiment, an attitude of the ultrasonic vibrator 3 is adjusted by elastic deformation of the supporting member 13 so that the projecting portions 11b of the vibration plate 11 correspond to the bottom surface of the friction plate 21 in space.

Figure 5B:
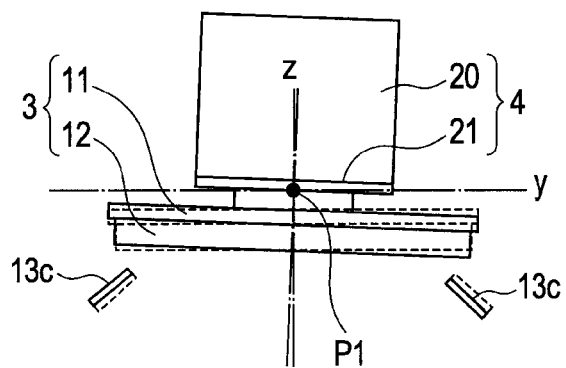
FIG. 5B is a partial sectional view of the vibration wave driving apparatus in Embodiment 1 of the present invention.

FIG. 5B shows a cross-sectional shape at the position shown by reference signs S in FIG. 5A.

Even in this figure, components unnecessary for explanation are omitted.

FIG. 5B expresses a state where the driven body 4 is misaligned around the X-axis from its attachment position.

An attitude change occurs in the ultrasonic vibrator 3 in such a manner that the bottom surface of the friction plate 21 of the driven body 4 and the top face of the projecting portion 11b of the vibration plate 11 follow each other. Since the ultrasonic vibrator 3 follows the plane having an angle around the X-axis, X-axis rotational displacement also occurs in the ultrasonic vibrator 3.

This attitude change of the ultrasonic vibrator 3 occurs when elastic deformation occurs in the elastically-deformable portions 13c of the supporting member 13.

As has been described with the use of FIGS. 4A to 4C, the shape of the supporting member 13 is determined so that the ultrasonic vibrator 3 causes rotational displacement around P1 in the figure, that is, around the axis of the X-direction located in the contact surfaces of the ultrasonic vibrator 3 and the driven body 4.

Only rotational displacement occurs around the P1 axis in the ultrasonic vibrator 3 and no deformation that translates in the Y-direction is accompanied therewith, thereby making it possible to achieve a stable contact state while a positional relationship in the Y-direction between the ultrasonic vibrator 3 and the driven body 4 is maintained.

That is, when force is exerted in the first direction which is orthogonal to the direction in which the ultrasonic vibrator 3 relatively moves the driven body 4 and to the pressed direction, rotational deformation of the elastically-deformable portions 13c accompanied with no deformation in the first direction occurs so that the frictional surface of the ultrasonic vibrator 3 can be displaced substantially parallel to the frictional surface of the driven body 4 without inclining the frictional surface of the ultrasonic vibrator 3 to the frictional surface of the driven body 4.

Figure 6A:
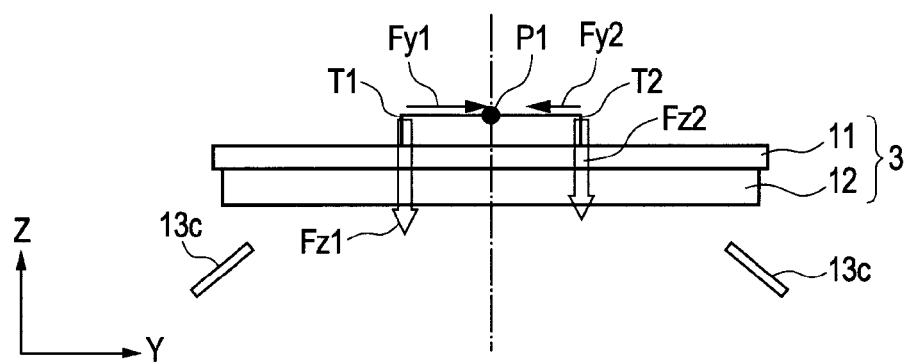
FIG. 6A is a schematic view showing an effect of the ultrasonic vibrator unit in Embodiment 1 of the present invention.
Figure 6B:
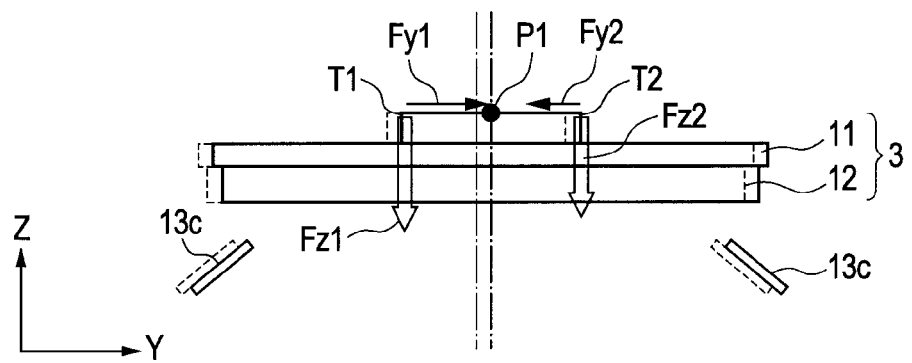
FIG. 6B is a schematic view showing an effect of the ultrasonic vibrator unit in Embodiment 1 of the present invention.

FIGS. 6A and 6B show cross-sectional views of the ultrasonic vibrator unit 2 at the position shown by the reference signs S shown in FIG. 5A. Even in these figures, components unnecessary for explanation are omitted.

Figure 13A:
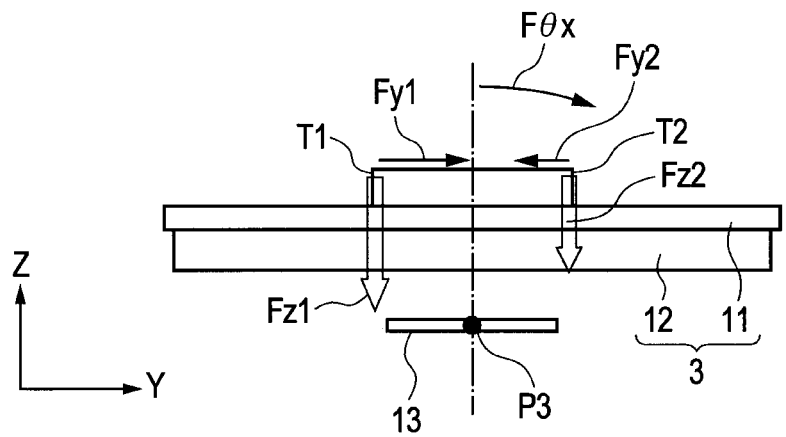
FIG. 13A is a schematic view showing an effect of an ultrasonic vibrator unit which describes a problem to be solved by the present invention.
Figure 13B:
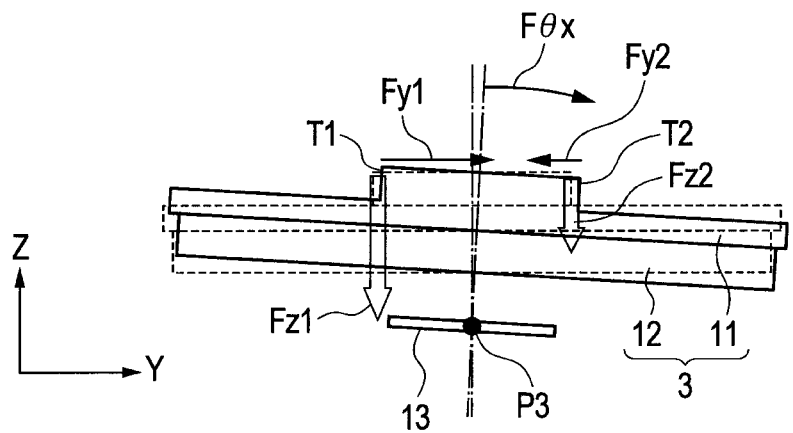
FIG. 13B is a schematic view showing an effect of the ultrasonic vibrator unit which describes the problem to be solved by the present invention.

Similarly to those explained with the use of FIGS. 13A and 13B, applied pressures Fz1 and Fz2 are respectively given to points T1 and T2 to cause generating forces Fy1 and Fy2.

A relation between the generating forces is expressed as |Fy1|>|Fy2|, and a resultant force thereof to the positive Y-direction works on the frictional surface of the ultrasonic vibrator 3.

This resultant force is located in a plane including the point P1, which causes only translational displacement in the Y-direction in the ultrasonic vibrator 3 as shown in FIG. 6B.

As such, only in-plane displacement from a former state occurs on the frictional surface of the ultrasonic vibrator 3, and thus, the contact state with the frictional surface of the driven body 4 does not change and a stable state can be maintained.

Figure 7:
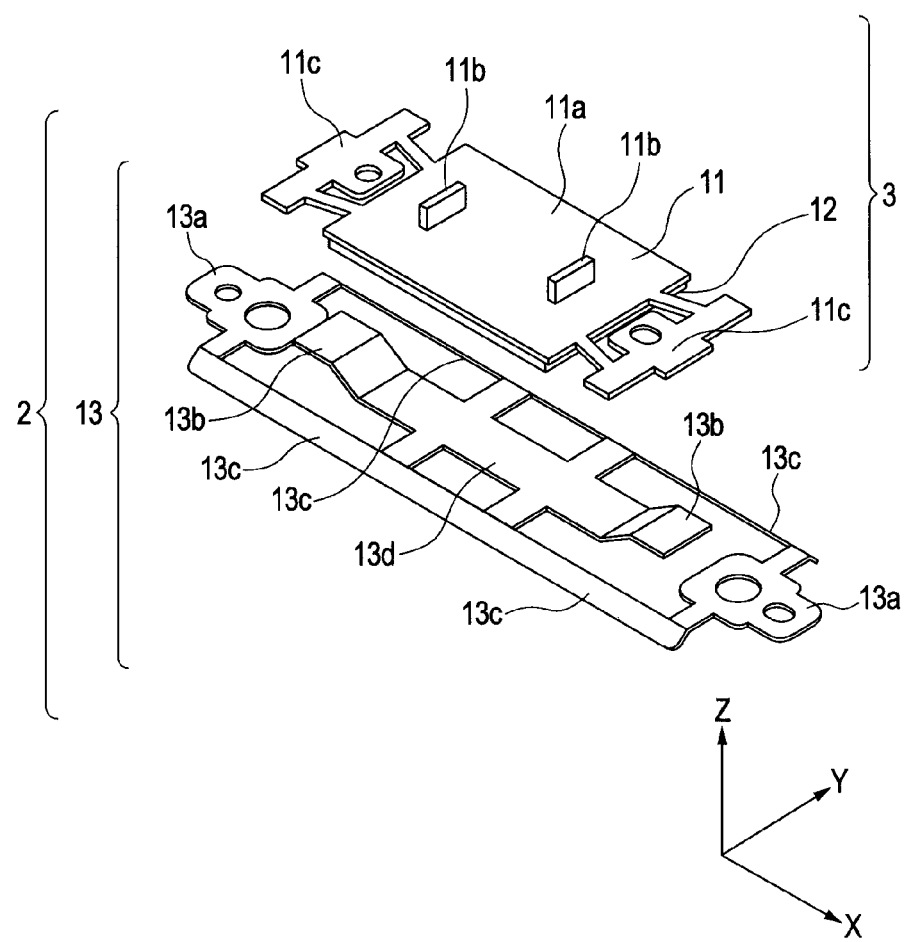
FIG. 7 is an exploded perspective view of the ultrasonic vibrator unit to show another configuration in Embodiment 1 of the present invention.

The ultrasonic vibrator unit 2 realizing the present embodiment is not limited to the above. For example, a similar effect can be obtained in an ultrasonic vibrator unit 2 shown in FIG. 7. FIG. 7 is an exploded perspective view of the ultrasonic vibrator unit 2, and an ultrasonic vibrator 3 and a supporting member 13 are integrated in a practical way.

Similarly to the ultrasonic vibrator shown in FIG. 2 and FIG. 3, the ultrasonic vibrator 3 is formed from a vibration plate 11 made from a ferromagnetic metal material and a piezoelectric element board 12 made from a piezoelectric material.

The vibration plate 11 includes a rectangular vibration portion 11a located substantially in the center thereof, projecting portions 11b formed at two portions in an X-direction in the figure on a top face of the vibration portion 11a, and fixed portions 11c formed at both sides of the vibration portion 11a in the X-direction.

The vibration plate 11 has a substantially symmetrical shape in the X-direction and a Y-direction.

The supporting member 13 is formed by cutout and bending processing from a thin sheet metal material.

The supporting member 13 has a substantially symmetrical shape in the X-direction and the Y-direction. The supporting member 13 is provided with two first fixed portions 13a extending in the X-direction in the figure.

Two second fixed portions 13b are formed at positions which are inside the first fixed portions 13a in the X-direction and which protectively correspond to the fixed portions 11c.

The second fixed portions 13b are shaped by bending processing to project into a Z-direction in the figure, and come into contact with the fixed portions 11c to be integrated therewith.

A reinforcement portion 13d is formed to connect the two second fixed portions. Four elastically-deformable portions 13c are formed to connect the first fixed portions 13a and the reinforcement portion 13d.

Thus, the supporting member may be configured according to the shape of the ultrasonic vibrator 3, and the same effect can be obtained even in the present embodiment.

Embodiment 2

Figure 8A:
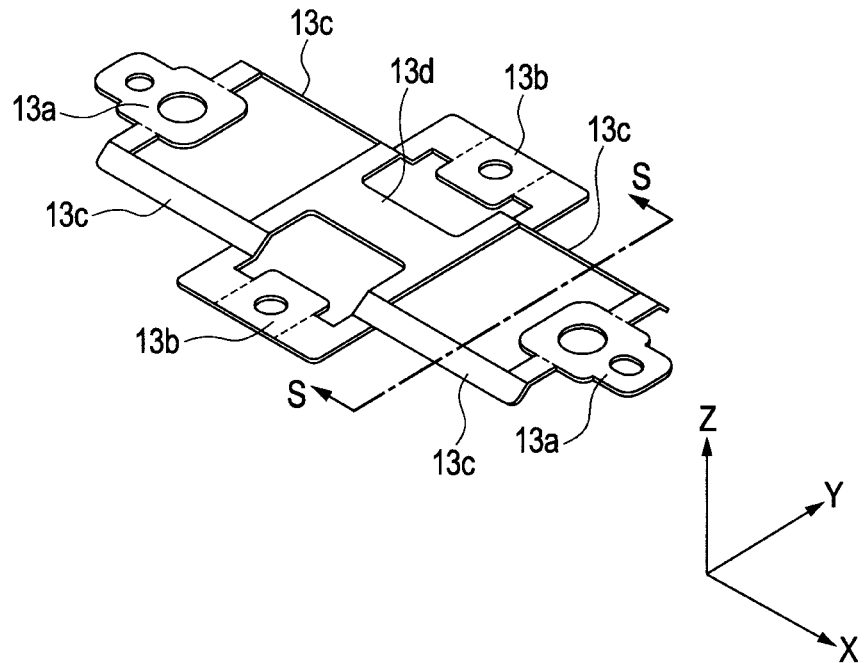
FIG. 8A is a perspective view of a supporting member in Embodiment 2 of the present invention.
Figure 8B:
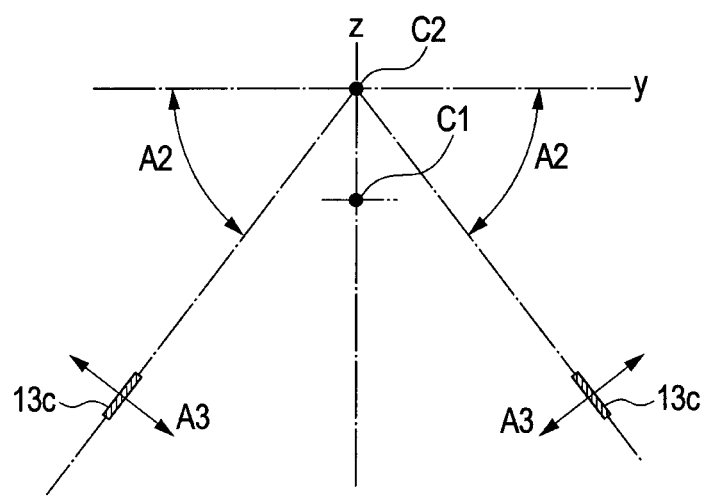
FIG. 8B is a cross-sectional view of the supporting member in Embodiment 2 of the present invention.

As Embodiment 2, the following describes an exemplary configuration of a vibration wave driving apparatus having a different configuration from that in Embodiment 1, with the use of FIGS. 8A and 8B.

FIG. 8A shows a perspective view of a supporting member 13 in the present embodiment.

A vibration wave driving apparatus 1 in the present embodiment has the same configuration as in Embodiment 1 except the supporting member 13, and therefore the explanation that has been already given is omitted.

Even the supporting member 13 is the same as that explained in FIGS. 4A to 4C except some parts, and therefore the explanation that has been already given is omitted.

FIG. 8B shows a YZ cross-section of elastically-deformable portions 13c taken along the position shown with reference signs S in FIG. 8A.

A reference sign C1 in the figure is the intersection (a rotation center of rotational deformation) of the extended lines of the cross-sections of the elastically-deformable portions 13c in Embodiment 1, shown in FIG. 4B, and is located in a vicinity of the frictional surface.

On the other hand, an intersection (a rotation center of rotational deformation) of extended lines of the cross-sections of the elastically-deformable portions 13c in the present embodiment is C2, and is located closer to a driven-body side than to the frictional surface.

More specifically, as shown in FIG. 8B, the shape of the intersection C2 is determined to be located on a positive side in the Z direction in the figure as compared with the intersection C1, and the angle A2 has a larger value.

When this supporting member 13 is used for the ultrasonic vibrator unit 2, the center of the X-axis rotational displacement of the ultrasonic vibrator 3 is vicinal to the intersection C2.

Figure 9A:
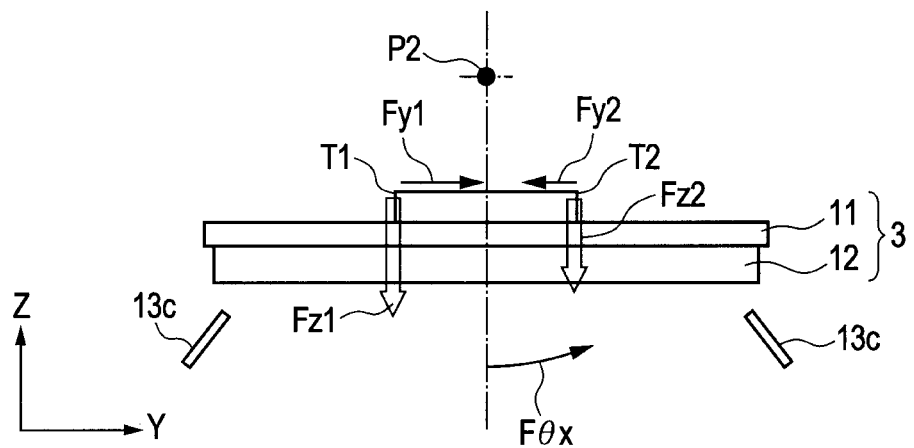
FIG. 9A is a schematic view showing an effect of an ultrasonic vibrator unit in Embodiment 2 of the present invention.
Figure 9B:
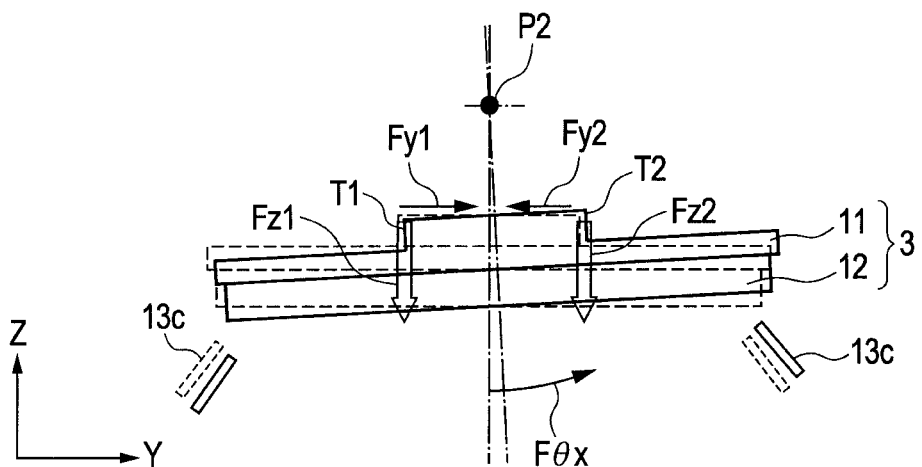
FIG. 9B is a schematic view showing an effect of the ultrasonic vibrator unit in Embodiment 2 of the present invention.
Figure 10A:
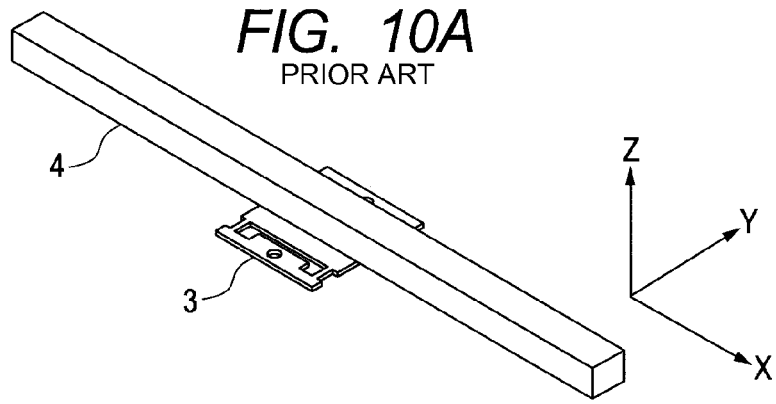
FIG. 10A is a perspective view of an ultrasonic vibrator and a driven body which describes a conventional example.
Figure 10B:
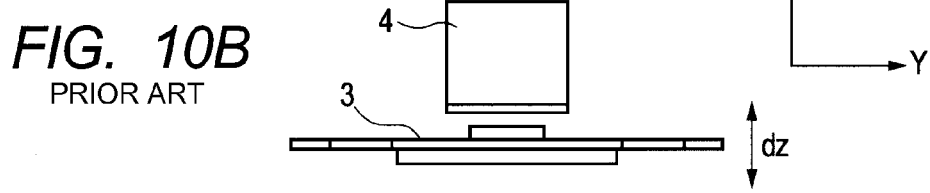
FIG. 10B is a cross-sectional view of the ultrasonic vibrator and the driven body which describes the conventional example.
Figure 10C:
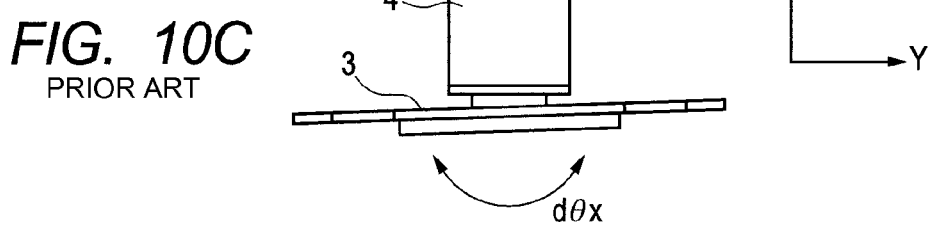
FIG. 10C is a cross-sectional view of the ultrasonic vibrator and the driven body which describes the conventional example.
Figure 10D:
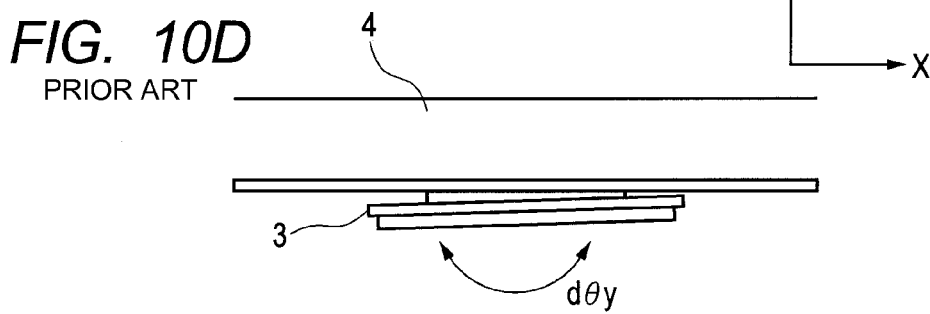
FIG. 10D is a cross-sectional view of the ultrasonic vibrator and the driven body which describes the conventional example.

FIGS. 9A and 9B are YZ cross-sectional views of the ultrasonic vibrator unit 2 in the present embodiment.

FIGS. 9A and 9B have a configuration similar to those shown in FIGS. 13A and 13B and FIGS. 6A and 6B. A point P2 is a center position of X-axis rotational displacement of the ultrasonic vibrator 3.

Similarly to those explained with the use of FIGS. 13A and 13B and FIGS. 6A and 6B, applied pressures Fz1 and Fz2 are respectively given to points T1 and T2 to cause generating forces Fy1 and Fy2. The expression |Fy1|>|Fy2| is formed, and as a resultant force of these forces, a force in a positive Y-direction occurs on a frictional surface of the ultrasonic vibrator 3.

As a result, a force F$\theta$x around the X-axis occurs with taking the point P2 as a center of the rotation in the ultrasonic vibrator 3, and the ultrasonic vibrator 3 causes X-axis rotational displacement around the point P2, as shown in FIG. 13B.

This displaces the point T1 in a negative Z-direction and the point T2 in a positive Z-direction, thereby resulting in that the applied pressure Fz1 at the point T1 decreases and the applied pressure Fz2 at the point T2 increases.

This effect decreases the difference between Fz1 and Fz2, and along with this, the difference between magnitudes of the generating forces, |Fy1| and |Fy2|, also decreases.

A resultant force of forces in the Y-direction occurring on the frictional surface of the ultrasonic vibrator 3 approaches zero, thereby making it possible to obtain an effect to adjust its contact state with the driven body 4 to a good state.

As has been described above, an adjusting effect works so that the applied pressure is substantially uniformly exerted on a whole top surface of the projecting portion 11b and abrasion of the frictional surface by driving progresses uniformly, thereby making it possible to secure original durability.

Due to these effects, while the vibration wave driving apparatus has a small and simple configuration, it can obtain a stable output over the long period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-077535, filed Mar. 31, 2011, which is hereby incorporated by reference herein in its entirety.

What is claimed is:

1. A vibration wave driving apparatus comprising:
   a vibrator including a vibration body having a frictional surface and an electrical-mechanical energy conversion element;
   a driven body which has a frictional surface having contact with the frictional surface of the vibrator and which is configured to be pressed through the respective frictional surfaces; and
   a supporting member having elastically-deformable portions for supporting the vibrator,
   wherein the driven body is relatively moved by elliptical motion of the vibrator through the respective frictional surfaces,
   wherein the supporting member is configured such that, when receiving a force in a first direction which is a direction orthogonal to a direction in which the vibrator relatively moves the driven body and a pressed direction in which the driven body is pressed, the supporting member is capable of displacing the frictional surface of the vibrator parallel to the frictional surface of the driven body by rotational deformation of the elastically-deformable portions,
   wherein the supporting member is at least partially made from a plate-like metal material, and the supporting member has a substantially symmetrical shape with respect to a plane having a normal line in the direction of the relative displacement and a plane having a normal line in the first direction,
   wherein the supporting member includes two fixed portions disposed at both sides thereof in the direction of the relative displacement, two holding portions disposed at both side thereof in the first direction, and four extending elastically-deformable portions extending in the direction of the relative displacement to connect the fixed portions and the holding portions, and wherein the elastically-deformable portions are at least partially subjected to bending processing so as to have an angle to a plane having a normal line in the pressed direction.

2. The vibration wave driving apparatus according to claim 1, wherein the supporting member has a rotation center of its rotational deformation located in a vicinity of the respective frictional surfaces.

3. The vibration wave driving apparatus according to claim 1, wherein the supporting member has a rotation center of its rotational deformation located closer to a side of the driven body than to the respective frictional surfaces.

4. The vibration wave driving apparatus according to claim 2, wherein the elastically-deformable portions are each formed so that a direction in which its stiffness is large corresponds to a direction inclined to the first direction on a plane having a normal line in a direction of the relative displacement, and the elastically-deformable portions are provided at positions to be symmetrical with respect to a plane having a normal line in the first direction, and an intersection of extended directions in which the elastically-deformable portions provided at the positions to be symmetrical have large stiffness is the rotation center of the rotational deformation of the supporting member.

5. The vibration wave driving apparatus according to claim 3, wherein the elastically-deformable portions are each formed so that a direction in which its stiffness is large corresponds to a direction inclined to the first direction on a plane having a normal line in a direction of the relative displacement, and the elastically-deformable portions are provided at positions to be symmetrical with respect to a plane having a normal line in the first direction, and an intersection of extended directions in which the elastically-deformable portions provided at the positions to be symmetrical have large stiffness is the rotation center of the rotational deformation of the supporting member.

6. A vibration wave driving apparatus moving a driven body, comprising:

a vibrator including a vibration body and an electrical-mechanical energy conversion element, the vibration body having a frictional surface having contact with a frictional surface of the driven body and being configured to be pressed to the frictional surface of the driven body; and a supporting member for supporting the vibrator, wherein the supporting member comprises two pairs of elastically-deformable portions, and wherein each pair of elastically-deformable portions is configured to be inclined at a substantially same angle to a plane having a normal line in a direction along which the frictional surface of the vibration body is pressed.

* * * * *